B. BUZZARD.
HANDLE FOR SHOVELS, SPADES, FORKS, AND THE LIKE.
APPLICATION FILED MAY 25, 1909.

945,691.

Patented Jan. 4, 1910.

Witnesses
G. M. Spring
C. R. Adams

Inventor
Benjamin Buzzard
David Moore
his Attorney

UNITED STATES PATENT OFFICE.

BENJAMIN BUZZARD, OF TOWER HILL, ILLINOIS.

HANDLE FOR SHOVELS, SPADES, FORKS, AND THE LIKE.

945,691.  Specification of Letters Patent.  Patented Jan. 4, 1910.

Application filed May 25, 1909. Serial No. 498,240.

*To all whom it may concern:*

Be it known that I, BENJAMIN BUZZARD, a citizen of the United States, residing at Tower Hill, in the county of Shelby and State of Illinois, have invented certain new and useful Improvements in Handles for Shovels, Spades, Forks, and the Like, of which the following is a specification, reference being had therein to the accompanying drawing.

My present invention relates to an improved handle for shovels, spades, forks and the like, and has special reference to a handle and securing means, whereby the handle is quickly and easily attached to the end of the handle proper; the fastening means being constructed to adjust itself to any diametered stick, thereby dispensing with the necessity of trimming the same to fit the sleeve of the handle.

To clearly understand my invention, attention is invited to the accompanying drawings, in which:—

Figure 1:
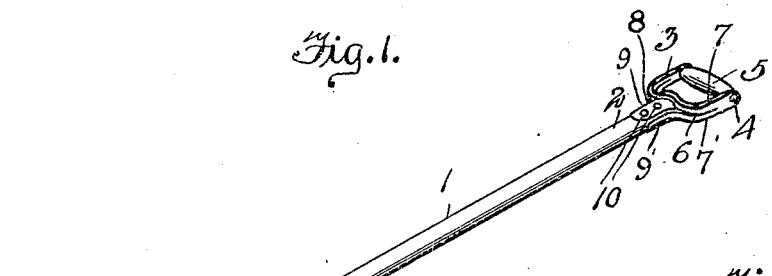
Figure 4:
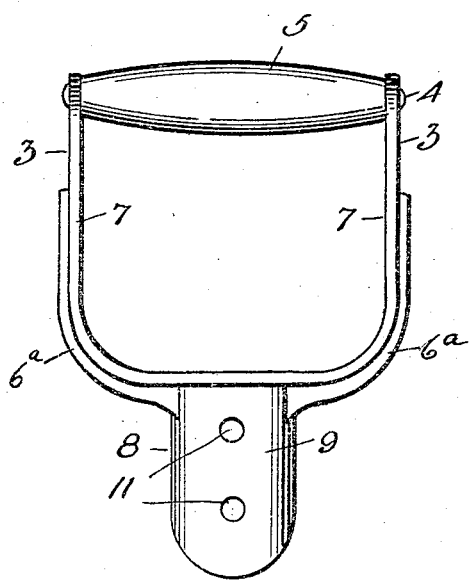
Figure 2:
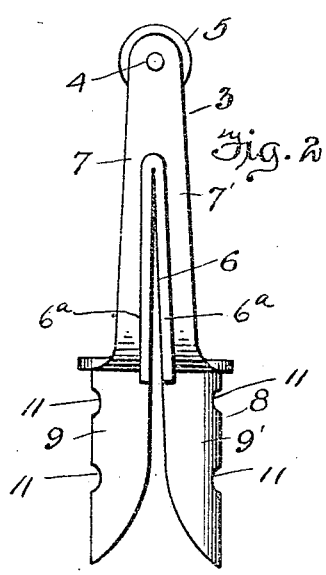
Figure 3:
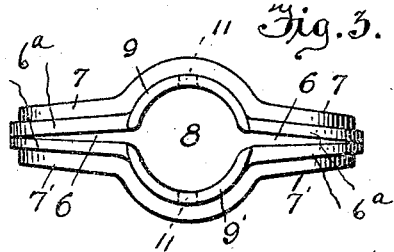

Figure 1 is a perspective view of a shovel equipped with my invention. Fig. 2 is a side view of the invention. Fig. 3 is a view taken from the socket end. Fig. 4 is a front elevation of the handle.

Referring to the drawings:—the numeral 1 designates the stick of the shovel, spade, pitch-fork or the like, whose extreme end 2, is cylindrical in cross section.

My improved handle comprises the yoke or bail 3, connected together by means of a rod 4, upon which is rotatably mounted the grip 5. The yoke or bail is preferably made of resilient metal and is split as at 6, so that the portions 7 and 7', may be forced away from each other as the end 2 of the stick 1, is forced through the socket 8, which is composed of the two semi-circular members 9 and 9'. The portion of the yoke upon both sides and practically surrounding the slot 6, is reinforced and forms a projecting ridge 6ª, as clearly shown. In order to secure the handle upon the end of the stick, after the same is thus fitted in the socket 8, I pass rivets 10, through the openings 11, of the members 9 and 9', and the end of the stick. It will thus be seen that I provide a handle of this character, which is quickly attached, and by reason of the spring tension of the split socket and yoke, the end of the stick or handle is forced through the socket easily and is gripped therein, while the socket or its members, is being riveted to the stick or handle. By this construction of handle, I dispense with the solid wood handles now used on shovels and spades, and provide a more substantial handle, which necessitates only that the end of the handle be turned round.

What I claim as new is:—

1. A handle, comprising a bail or yoke made of resilient metal, a rod connecting the free ends of the same, a grip carried by said rod, and a socket carried by the yoke and integral therewith, said socket and a portion of the body of the yoke upon both sides of the socket being split, whereby the portions upon each side of the split may be forced apart by the stick to which the handle is to be applied, as set forth.

2. A handle, comprising a bail or yoke, and an integral member constituting a socket for the reception of a stick, said socket and yoke being split so that the sides thereof will be spread apart as the socket is slid upon the stick and grip the stick by the tension of the spread portions toward each other.

3. A handle, comprising a U-shaped yoke or bail, the sides of the yoke or bail being provided with exterior slotted ridges terminating near the center thereof, and two semi-circular members carried by the bail and having dividing slots in line with the slots of the yoke, as and for the purpose set forth.

In testimony whereof I affix my signature in presence of two witnesses.

BENJAMIN BUZZARD.

Witnesses:
F. A. MARTIN,
L. E. FISH.